(No Model.) 2 Sheets—Sheet 2.
W. J. SMITH.
FEED WATER PURIFIER.
No. 402,199. Patented Apr. 30, 1889.
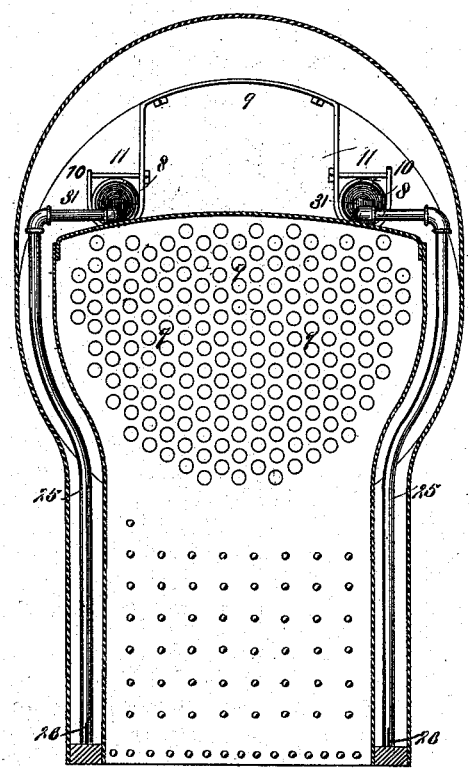
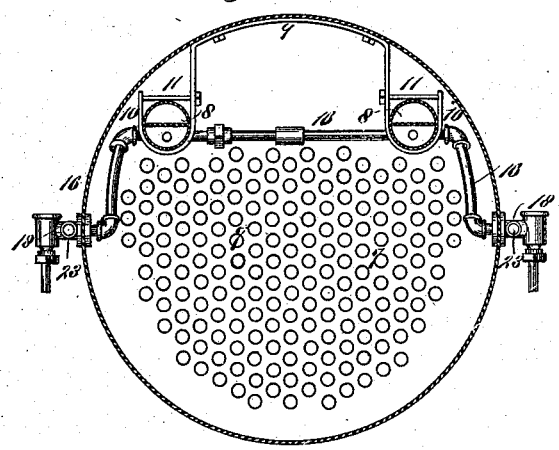
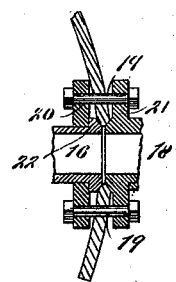
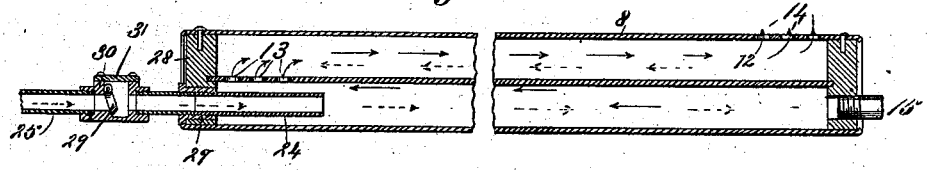
Witnesses:
Charles Pickles.
G. N. Hinchman Jr.
Inventor:
Wm J. Smith,
By Fowler & Fowler
Attorneys ated April 30, 1889.

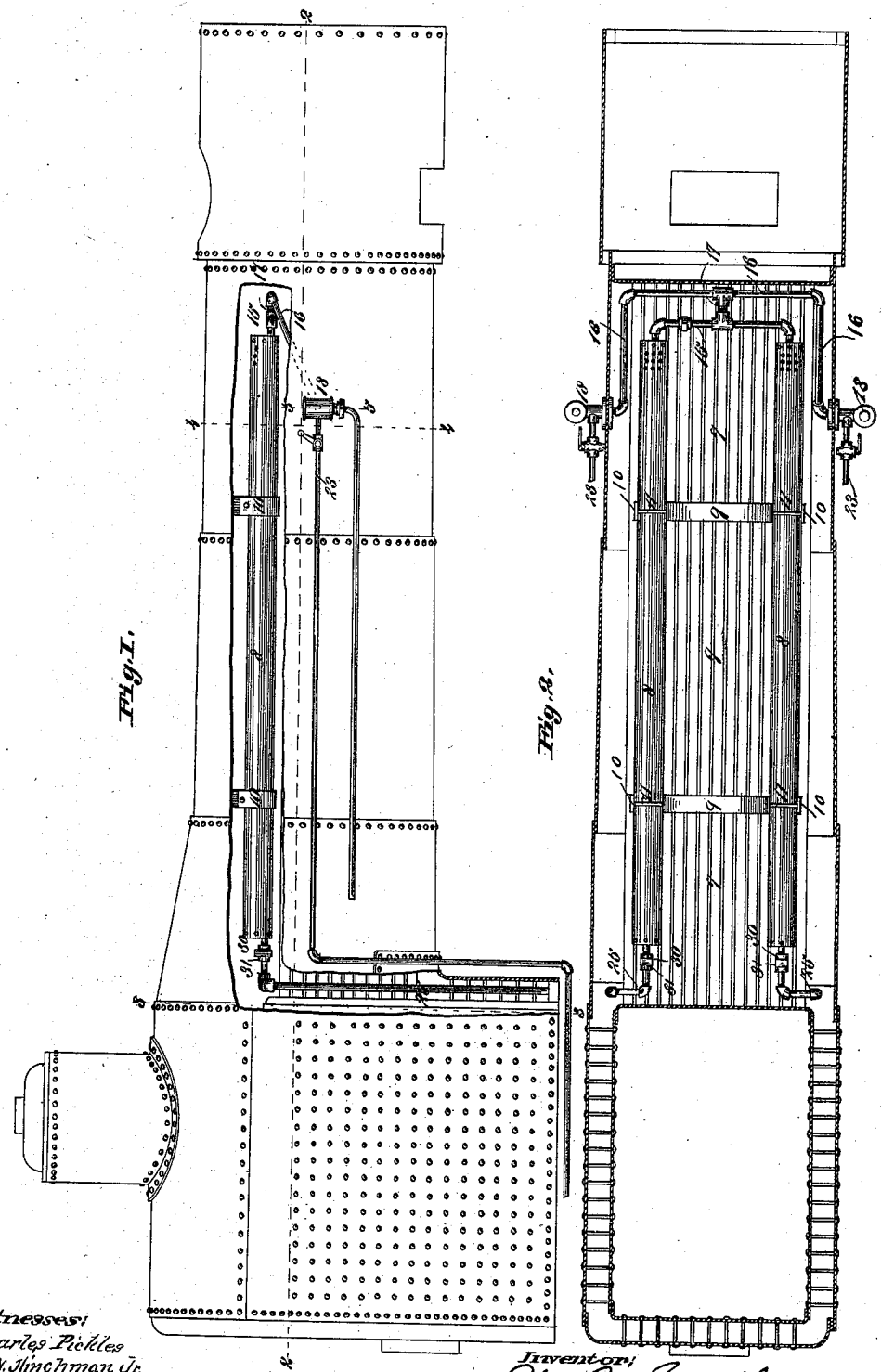

UNITED STATES PATENT OFFICE.

WILLIAM J. SMITH, OF CHICAGO, ILLINOIS, ASSIGNOR TO THE SMITH FEED WATER HEATER AND PURIFIER COMPANY, OF ST. LOUIS, MISSOURI.

FEED-WATER PURIFIER.

SPECIFICATION forming part of Letters Patent No. 402,199, dated April 30, 1889.

Application filed December 11, 1888. Serial No. 293,288. (No model.)

*To all whom it may concern:*

Be it known that I, WILLIAM J. SMITH, a citizen of the United States, residing at Chicago, in the State of Illinois, have invented certain new and useful Improvements in Feed-Water Purifiers, of which the following is such a full, clear, and exact description as will enable any one skilled in the art to which it appertains to make and use the same, reference being had to the accompanying drawings, forming part of this specification.

My invention consists in an improvement upon an invention described and claimed by me in Letters Patent No. 349,181, granted September 14, 1886, and relates to details of construction, but more especially to a blow-off attachment to be used in connection with my purifier, whereby should any mud or sediment reach the boiler it will be removed therefrom when blowing off the purifier.

Figure 1 is a side elevation showing my invention applied to a locomotive-boiler. Fig. 2 is a section on the line 2 2 of Fig. 1. Fig. 3 is a section on the line 3 3 of Fig. 1. Fig. 4 is a section on the line 4 4 of Fig. 1. Fig. 5 is a section on the line 5 5 of Fig. 1, on an enlarged scale; and Fig. 6 is a section showing the purifier and blow-off connection on an enlarged scale.

The same figures of reference indicate the same parts throughout the several views.

Before proceeding with my invention I will remark that, although I have shown said invention as applied to a locomotive-boiler, I do not wish to confine the same to such a boiler, for it can be used with any other kind of boiler without departing from the invention.

7 are the fire-tubes of the boiler, and 8 8 are the purifier-tubes, two of which I preferably place in each boiler. The purifiers are supported by a bracket, 9, attached to the top of the boiler, and has two depending curved parts, 10 10, which receive the purifiers, and have also bolts 11, which draw the free ends of the parts 10 against said purifiers and hold them tightly in place. Any number of these brackets can be used to support the purifiers.

Within the purifier is a diaphragm, 12, located about midway of the same, and has a series of holes, 13, in it at the opposite end of the purifier through which the feed-water enters. The tops of said purifiers are perforated by holes 14 at the end where the feed-water connection 15 enters the purifier. I arrange the purifier in the boiler so that the holes 14 are at the water-line in said boiler, so that when the purifier is blown off the surface of the water will be skimmed, and thus the purifier will act as a surface-skimmer. The feed-water passes below the diaphragm through the holes 13 and emerges from the holes 14 into the boiler, (as shown by the arrows in full lines in Fig. 6,) all of which is explained in my previous patent, referred to above. The pipe 15 (see Fig. 2) connects with both purifiers, and is supplied by a pipe, 16, by means of a short connection, 17, which pipe 16 opens into pump or injector connections 18 18, respectively, on each side of the locomotive.

The pump or injector connections are under the control of the engineer. Where the pipe 16 joins the connections 18 at each side of the boiler and perforates the boiler-shell, connection is made between the two by bolts 19 19, that pass through a ring, 20, on the pipe 16, and a flange, 21, on the connection 18, as shown in Fig. 5. The pipe 16 has a flange, 22, against which the ring 20 takes. By this means the two parts are drawn tightly together, and the pipes are supported from the boiler-shell.

It will be noted that the joints of the pipes 15, 16, and 17, and the connection between said pipe 15 and the purifier-tubes 8 8 are all located within the interior of the boiler, which I regard as important. From the pump and injector connections 18 18 extend blow-off pipes 23, Figs. 1, 2, and 4, which are under the control of the engineer, so that when the pump or injector is cut off the current will be reversed in the purifier and blow out all the mud and sediment deposited in said purifier.

I come now to the main feature of the present invention, and that is a device which is adapted to be used with the purifier, as above described. This device relates to a supplementary blow-off arrangement connected with the purifier, whereby, when the purifier is blown off, the sediment and mud deposited in the boiler will be drawn out. Below the diaphragm, Fig. 6, of the purifier, at the end of said purifier remote from the feed-water connection 15, is a nozzle, 24, which projects a short distance beyond the holes 13. Opening into this nozzle is a pipe, 25, which passes near the bottom of the boiler, its ends being left open or provided with slots or holes 26. Each purifier is provided with one of these pipes 25, and where the purifier is used with a locomotive-boiler the said pipe 25 passes down into the water-leg at each side of the boiler. The nozzle 24 and the pipe 25 are screwed into a nut, 27, that is itself screwed into the casting 28 at one end of the purifier. Within the pipe 25 is a valve, 29, so arranged that the feed-water in passing into the boiler closes said valve; but when the current is reversed in blowing off the valve will be opened and will cause a circulation in pipe 25 in the direction of the arrows in dotted lines in said pipe, and will thus suck up the mud or sediment that may be deposited in the bottom of the boiler. This action is caused by the suction created around the nozzle 24 in the operation of blowing off. More or less sediment is bound to reach the interior of boilers, no matter how effective purifiers may be, and such sediment will naturally gravitate to the lowest point of the boiler, and if undisturbed will, in the course of time, incrust the boiler at said point. This incrustation, moreover, forms at the most undesirable place in boilers, for most of the heat is usually applied along the bottom of boilers, and this incrustation cuts off just so much of the heat from the water in the boiler.

By attaching the suction-pipe 25 to my purifier I effectually remove all sediment that may reach the boiler, in spite of the purifier, and thus effectively prevent boilers from being incrusted, and by arranging the holes 14 at or near the water-level I also skim the surface of the water in the boiler when blowing off the purifier. The valve 29 is placed in a short pipe, 30, which is made to accommodate said valve, and said pipe 30 is provided with a movable plate, 31, by which access may be had to said valve should it get out of order. The purifier-tubes are constructed so as to be inserted in the boiler through the man-hole or dry-pipe hole in the front flue-sheet of said boiler, thus obviating the necessity of cutting a hole in the end of the boiler.

Having now fully described my invention, what I desire to claim and secure by Letters Patent of the United States is—

1. The combination, with a feed-water purifier, of a suction-pipe connecting the bottom of the boiler with said feed-water purifier, and a valve in said pipe whereby the feed-water is prevented from passing through said pipe and the sediment is drawn off by said pipe when blowing off the purifier.

2. The combination, with a feed-water purifier located within a boiler, of a pipe, 25, opening into said purifier, and having its other end communicating with the water at or near the bottom of said boiler, and a valve in said pipe whereby the feed-water is prevented from entering the boiler by way of said pipe and circulation is caused in said pipe when blowing off said purifier.

3. The combination, with a feed-water purifier located wholly within the boiler, having a diaphragm intermediate of it provided with holes 13, of a pipe, 25, projecting in said purifier below said diaphragm beyond the holes 13, its other end being open or provided with holes communicating with the water of the boiler, and a valve in said pipe for preventing the feed-water from entering the boiler by way of said pipe.

4. The combination, with a feed-water purifier having one or more apertures through which the feed-water passes to the boiler, said aperture or apertures being arranged at the water-level of said water, of a suction-pipe provided with a valve and connected to said purifier and passing to or near the bottom of the boiler, whereby when the purifier is blown off the surface of the water in the boiler will be skimmed and the sediment deposited in said boiler will be removed.

5. The combination, as hereinbefore set forth, of the tubes 8 8, arranged within and at each side of the boilers, brackets 9 9 for supporting said tubes from the boiler-shell, pipes connecting said tubes with pump and injector connections, the connection between said pipes and said tubes being made inside of the boiler, a diaphragm within said tubes, holes 13 and 14, as described, in the diaphragm and purifier-tubes, respectively, a pipe extending into the lower compartment of said purifier-tubes beyond the holes 13 and connected with the boiler, and a valve, 29, in said pipe, substantially as and for the purpose set forth.

In testimony whereof I have hereunto set my hand and affixed my seal, this 7th day of December, 1888, in the presence of the two subscribing witnesses.

WILLIAM J. SMITH. [L. S.]

Witnesses:
CHARLES F. LOESCH,
CHARLES A. ALLEN.